(12) United States Patent
Harrison et al.

(10) Patent No.: US 7,823,582 B2
(45) Date of Patent: Nov. 2, 2010

(54) METHOD AND APPARATUS FOR SOLAR COLLECTOR WITH INTEGRAL STAGNATION TEMPERATURE CONTROL

(75) Inventors: Stephen J. Harrison, Kingston (CA); Qin Lin, Kingston (CA); Lucio C. Mesquita, Toronto (CA); David A. Valletta, Kingston (CA)

(73) Assignee: Queen's University at Kingston, Kingston, Ontario (CA)

( * ) Notice: Subject to any disclaimer, the term of this patent is extended or adjusted under 35 U.S.C. 154(b) by 0 days.

(21) Appl. No.: 11/511,493

(22) Filed: Aug. 29, 2006

(65) Prior Publication Data

US 2007/0272233 A1   Nov. 29, 2007

Related U.S. Application Data

(63) Continuation of application No. 10/772,321, filed on Feb. 6, 2004, now Pat. No. 7,143,762.

(60) Provisional application No. 60/445,457, filed on Feb. 7, 2003.

(51) Int. Cl.
    *F24J 2/40* (2006.01)
(52) U.S. Cl. ...................... 126/589; 126/714
(58) Field of Classification Search ................ 126/589, 126/599, 585, 595, 643, 651
    See application file for complete search history.

(56) References Cited

U.S. PATENT DOCUMENTS

| 246,626 A | 9/1881 | Morse |
|---|---|---|
| 4,046,134 A | 9/1977 | Scott |
| 4,150,659 A | 4/1979 | Buckley |
| 4,219,009 A | 8/1980 | Palmer |
| 4,226,225 A | 10/1980 | Niedermeyer |

(Continued)

FOREIGN PATENT DOCUMENTS

JP    59-081448    5/1984

(Continued)

OTHER PUBLICATIONS

Azevedim L.F.A. et al., "Natural Convection in Open-Ended Inclined Channels," *Journal of Heat Transfer*, 107: 893-901, 1985.

(Continued)

*Primary Examiner*—Alfred Basichas
(74) *Attorney, Agent, or Firm*—Stephen J. Scribner

(57) ABSTRACT

This invention relates to a method and apparatus for a solar collector having intergral control of the maximum temperature that it can reach, thereby avoiding excessive stagnation temperatures in the collector. In one embodiment, a solar collector comprises a top portion comprising glazing, a bottom portion; an absorber disposed between said top portion and said bottom portion for absorbing solar energy received through said glazing, said absorber in a spaced relationship above said bottom portion such that a channel is defined between a lower surface of said absorber and an upper surface of said bottom portion; an inlet and an outlet associated with and at substantially opposite ends of said channel between said absorber and said bottom portion, for ventilating said channel; and a damper for opening said outlet at a temperature equal to or above a first selected temperature and for closing said outlet at a temperature equal to or below a second selected temperature; wherein said first and second selected temperatures are below a stagnation temperature of the solar collector.

17 Claims, 3 Drawing Sheets

U.S. PATENT DOCUMENTS

| | | | |
|---|---|---|---|
| 4,237,865 A | | 12/1980 | Lorenz |
| 4,270,517 A | | 6/1981 | Stephens |
| 4,422,443 A | | 12/1983 | Arendt |
| 4,469,087 A | | 9/1984 | Cameron |
| 4,478,210 A | * | 10/1984 | Sieradski .................... 126/570 |
| 4,503,840 A | | 3/1985 | Chertok |
| 4,716,882 A | * | 1/1988 | Ishida ........................ 126/650 |
| 5,404,867 A | | 4/1995 | Rich |
| 7,143,762 B2 | * | 12/2006 | Harrison et al. ............. 126/589 |

OTHER PUBLICATIONS

Bar-Cohen, A. et al., "Thermally Optimum Spacing of Vertical, Natural Convection Cooled, Parallel Plates," *Journal of Heat Transfer*, 106: 116-123, 1984.

Inaba, H. "Natural Convection in an Inclined Rectangular Channel Heated From the Bottom Surface," *Journal of Heat Transfer*, 108: 764-769, 1986.

Lin, Q. et al., "Experimental Study of Natural Convection in an Asymmetrically Heated Inclined Channel With Radiation Exchange," Proceedings of HT2003, ASME Summer Heat Transfer Conference, Jul. 21-23, 2003.

Manca, O. et al., "Composite Correlations for Air Natural Convection in Tilted Channels," Heat Transfer Engineering, 20(3): 64-72, 1999.

Straatman, A.G., et al., "A Study of Natural Convection Between Inclined Isothermal Plates," Journal of Heat Transfer, 116: 243-245 1994.

Webb, B.W., et al., "High Rayleigh Number Laminar Natural Convection in an Asymmetrically Heated Vertical Channel," Journal of Heat Transfer, 111: 649-656, 1989.

* cited by examiner

US 7,823,582 B2

METHOD AND APPARATUS FOR SOLAR COLLECTOR WITH INTEGRAL STAGNATION TEMPERATURE CONTROL

RELATED APPLICATIONS

This application is a continuation of U.S. patent application Ser. No. 10/772,321, filed Feb. 6, 2004, now U.S. Pat. No. 7,143,762, issued Dec. 5, 2006, and claims the benefit of the filing date of U.S. Provisional Patent Application No. 60/445,457, filed Feb. 7, 2003, the contents of which are incorporated herein by reference in their entirety.

FIELD OF THE INVENTION

This invention relates to a method and apparatus for a solar collector having integral control of the maximum temperature that it can reach, thereby avoiding excessive stagnation temperatures in the collector.

BACKGROUND OF THE INVENTION

With all solar collectors there exists the potential for the collectors to reach very high temperatures, particularly during periods where there is little or no heat removal from the collectors. For example, in solar heating systems that rely on the circulation of a heat transfer fluid through absorbers to remove heat from collectors, such as solar hot water systems, the collectors can reach high temperatures during power failures when circulation of the heat transfer fluid stops, or during prolonged periods of little or no hot water consumption. Under these conditions, solar collectors may reach "stagnation" temperatures exceeding 170° C. In addition to the possibility of damage to collector components, exposure to such high temperatures can rapidly degrade or even boil the heat transfer fluid. Also, excessive pressures will result in the solar collector heat transfer loop as a result of the high stagnation temperatures.

The problem is particularly acute in climates where there is a potential for the occurrence of freezing temperatures during part of the year. Solar heating systems designed for these climates typically use an anti-freeze heat transfer fluid to transport heat from the solar collectors to a load. Commonly used anti-freeze fluids are propylene-glycol/water mixtures, which are subject to deterioration at elevated temperatures (e.g., greater than approximately 120° C.). Elevated collector temperatures may cause this heat transfer fluid to become corrosive, resulting in accelerated fouling and corrosion of the solar collector components and associated system components.

In addition to these reliability issues, elevated solar collector temperatures in solar hot water systems may also result in scalding temperatures in the hot water storage—a potentially dangerous situation for users of the system. To avoid this potentially harmful situation, it is possible to shut down the circulation of heat transfer fluid through the solar collectors (e.g., by shutting down the circulation pump) when the thermal storage reaches a high temperature. While this reduces the potential for scalding, it only aggravates the high stagnation temperature problem.

There have been proposed a number of designs for avoiding excessive temperatures in solar collectors. For example, U.S. Pat. No. 4,150,659 to Buckley, U.S. Pat. No. 4,219,009 to Palmer, and U.S. Pat. No. 4,503,840 to Chertok each disclose a solar collector in which venting of the space between the absorber and the glazing is provided, by disposing vents with thermally-actuated dampers on the upper surfaces or ends of the collectors. U.S. Pat. No. 4,046,134 to Scott proposed a solar collector in which the space between the glazing and the absorber was vented by raising and lowering the glazing above the rest of the collector, using a thermally-actuated mechanism. U.S. Pat. No. 5,404,867 to Rich disclosed a solar collector in which the space between the glazing and the absorber was vented by providing a glazing that flexed when a certain high temperature was reached, thereby providing ventilation at the perimeter of the glazing. U.S. Pat. No. 4,226,225 to Niedermyer disclosed a solar collector in which the space on either side of the absorber was vented by thermally-actuated vents disposed on the sides of the collector. U.S. Pat. No. 4,422,443 described a solar collector with double glazing, in which the space between the glazing was vented by thermally-actuated vents disposed on the sides of the collector. U.S. Pat. No. 4,237,865 to Lorenz disclosed a solar heating panel having an air channel, for convective air heating of a building. Thermally-actuated vents disposed on the front of the panel provided venting of the channel. However, a problem with all of these previous designs is that the vents are provided on the top or sides of the collector, which allows for debris and moisture to enter the collector and accumulate on the inner surface of the glazing and on the surface of the absorber, lowering efficiency and increasing maintenance costs of the collector. Further, such placement of the vents renders them vulnerable to weather, reducing their reliability.

SUMMARY OF THE INVENTION

According to a first aspect of the invention there is provided a solar collector comprising: a top portion comprising glazing, a bottom portion; an absorber disposed between said top portion and said bottom portion for absorbing solar energy received through said glazing, said absorber in a spaced relationship above said bottom portion such that a channel is defined between a lower surface of said absorber and an upper surface of said bottom portion; an inlet and an outlet associated with and at substantially opposite ends of said channel between said absorber and said bottom portion, for ventilating said channel; and damper for opening said outlet at a temperature equal to or above a first selected temperature and for closing said outlet at a temperature equal to or below a second selected temperature; wherein said first and second selected temperatures are below a stagnation temperature of the solar collector.

In some embodiments, said first selected temperature and said second selected temperature are the same. In a preferred embodiment, said bottom portion comprises said inlet and said outlet, and said outlet may be elevated relative to said inlet.

In a preferred embodiment, at least one surface defining said channel is a high-emissivity surface. The high-emissivity surface may comprise a high-emissivity coating. Preferably, said at least one surface has an emissivity of at least 0.5.

In some embodiments, said absorber is in a substantially parallel spaced arrangement below said glazing, and said space between said absorber and said glazing is isolated from said channel. At least one of said opening and said closing of said damper may be passively-actuated. The damper may be thermally-actuated and comprise at least one member selected from the group consisting of a gas-charged piston, a wax-filled actuator, a bimetallic spring, and a shape-memory alloy.

According to a second aspect of the invention there is provided a method of controlling temperature in a solar collector, the solar collector comprising a top portion comprising glazing, a bottom portion, and an absorber disposed between said top portion and said bottom portion for absorbing solar energy received through said glazing, said method comprising: disposing said absorber in a spaced relationship above said bottom portion such that a channel is defined between a lower surface of said absorber and an upper surface of said bottom portion; providing an inlet and an outlet associated with and at substantially opposite ends of said channel, for ventilating said channel; opening said outlet at a temperature equal to or above a first selected temperature; and closing said outlet at a temperature equal to or below a second selected temperature; wherein said first and second selected temperatures are below a stagnation temperature of the solar collector.

In some embodiments the method further comprises disposing said solar collector such that said outlet is elevated relative to said inlet. In a preferred embodiment the method further comprises providing high emissivity to at least one of said surfaces defining said channel. The at least one high emissivity surface may be provided by applying a high emissivity coating thereto, and the emissivity may be at least about 0.5.

The method may further comprise passively opening and closing said outlet, and a thermally-actuated damper may be used. In various embodiments, opening and closing of said outlet is performed by an actuator selected from the group consisting of a gas-charged piston, a wax-filled actuator, a bimetallic spring, and a shape-memory alloy.

According to a third aspect of the invention there is provided a method of preventing overheating of a solar collector, the solar collector comprising a top portion comprising glazing, a bottom portion, and an absorber disposed between said top portion and said bottom portion for absorbing solar energy received through said glazing, said method comprising: disposing said absorber in a spaced relationship above said bottom portion such that a channel is defined between a lower surface of said absorber and an upper surface of said bottom portion; providing an inlet and an outlet associated with and at substantially opposite ends of said channel, for ventilating said channel; opening said outlet at a temperature equal to or above a first selected temperature; and closing said outlet at a temperature equal to or below a second selected temperature; wherein said first and second selected temperatures are below a stagnation temperature of the solar collector.

In some embodiments the method further comprises disposing said solar collector such that said outlet is elevated relative to said inlet. In a preferred embodiment the method further comprises providing high emissivity to at least one of said surfaces defining said channel. The at least one high emissivity surface may be provided by applying a high emissivity coating thereto, and the emissivity may be at least about 0.5.

The method may further comprise passively opening and closing said outlet, and a thermally-actuated damper may be used. In various embodiments, opening and closing of said outlet is performed by an actuator selected from the group consisting of a gas-charged piston, a wax-filled actuator, a bimetallic spring, and a shape-memory alloy.

According to a fourth aspect of the invention there is provided a solar energy system comprising: a solar collector as described herein; heat transfer apparatus for removing heat from said collector; and a heat sink or load for accepting heat from said heat transfer apparatus. The heat transfer apparatus may comprises a heat transfer fluid. The solar energy system may be a solar hot water system.

According to a fifth aspect of the invention there is provided a solar collector comprising: an enclosure having top, bottom, and side portions, said top portion comprising glazing, and said bottom portion having an inlet and an outlet; an absorber within said enclosure for absorbing solar energy received through said glazing; a venting channel between said absorber and said bottom portion of said enclosure, said venting channel in communication with said inlet and said outlet at substantially opposite ends of said venting channel; and means to close said outlet at a temperature equal to or below a first selected temperature and to open said outlet at a temperature equal to or above a second selected temperature; wherein said first and second selected temperatures are below a high stagnation temperature of the solar collector.

Preferably, the solar collector is disposed such that said outlet is elevated relative to said inlet.

In certain embodiments, the means to open and close the outlet is passive. In some embodiments, the means to open and close the outlet is thermally-actuated. In such embodiments, the means to open and close the outlet comprises an actuator selected from the group consisting of a gas-charged piston, a wax filled actuator, a bimetallic spring, and a shape-memory alloy. In a preferred embodiment, the means to open and close the outlet comprises a shape-memory alloy actuator.

In accordance with the invention, upon opening of the outlet, air flows from the inlet through the venting channel to the outlet by convection, and, upon closing of the outlet, the airflow by convection substantially stops.

In some embodiments, the first selected temperature and the second selected temperature are substantially the same.

In accordance with a sixth aspect of the invention there is provided a method of controlling stagnation temperature in a solar collector, comprising: providing a solar collector as described in the first aspect of the invention; closing said outlet at a temperature equal to or below a first selected temperature; and opening said outlet at a temperature equal to or above a second selected temperature; wherein said first and second selected temperatures are below a high stagnation temperature of the solar collector.

Preferably, the solar collector is disposed such that said outlet is elevated relative to said inlet.

In certain embodiments, the opening and closing of the outlet is passive. In preferred embodiments, the opening and closing of the outlet is thermally-actuated. In further embodiments, the opening and closing of the outlet is performed by an actuator selected from the group consisting of a gas-charged piston, a wax filled actuator, a bimetallic spring, and a shape-memory alloy. In a preferred embodiment, the opening and closing of the outlet is performed by a shape-memory alloy actuator.

In some embodiments, upon opening of the outlet, air flows from the inlet through the venting channel to the outlet by convection, and, upon closing of the outlet, the airflow by convection substantially stops.

In a preferred embodiment, the first selected temperature and the second selected temperature are substantially the same.

According to a seventh aspect of the invention there is provided a solar energy system comprising: the solar collector described above; means for removing heat from the collector; and means for storing the heat. In one embodiment, the means for removing heat is a circulating heat transfer fluid. In another embodiment, the solar energy system is a solar hot water system.

BRIEF DESCRIPTION OF THE DRAWINGS

The invention is described below, by way of example, with reference to the accompanying drawings, wherein:

In FIG. 1A, the collector is shown in with the venting channel closed, and in FIG. 1B, the collector is shown with the venting channel open.

DETAILED DESCRIPTION OF THE INVENTION

Figure 1A:
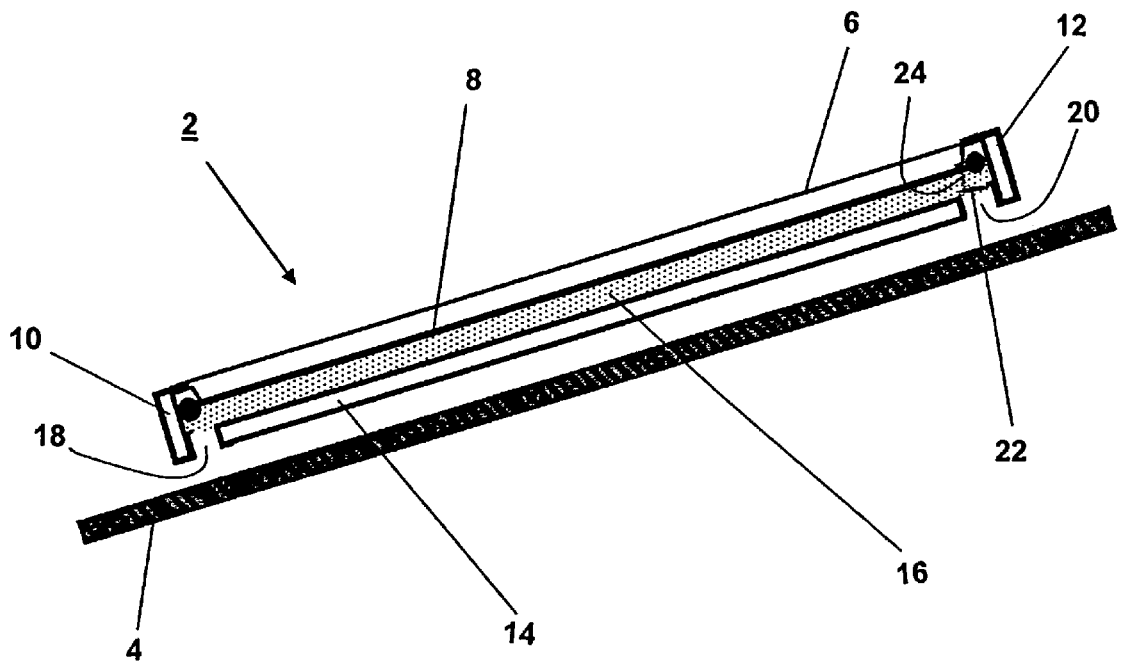
FIGS. 1A and 1B are longitudinal cross sections of solar collector according to an embodiment of the invention.

This invention relates to stagnation temperature control in any type of solar collector in which stagnation is possible. Such solar collectors typically have a substantially flat, glazed surface which is oriented towards the sun. The glazing can be glass, or any plastic or other material capable of withstanding the temperatures and environmental conditions to which the collector is exposed, while allowing sufficient solar radiation to be transmitted through and heat the absorber. The glazing surface can be of any shape, but is usually square or rectangular. In most solar energy systems, an absorber plate is disposed in a parallel spaced relationship below the glazing. The absorber absorbs solar energy received through the glazing, raising its temperature. In solar energy systems that employ a heat transfer fluid to remove heat from the absorber, the fluid circulates through the absorber. The solar collector is typically enclosed by sides and a bottom panel, to keep heat in, and which may be insulated for this purpose. It is possible, therefore, under conditions where there is high solar energy input to the collector, and/or little or no heat removal from the collector, for the collector to reach an excessive stagnation temperature.

As used herein, the terms "stagnation temperature", "high stagnation temperature" and "excessive stagnation temperature" are interchangable and are intended to refer to any situation under which the rate of heat gain or absorption by a solar collector exceeds the rate of heat removal from the collector (e.g., stagnation), such that the temperature of the solar collector and/or its components increases to a point where overheating of the collector occurs and damage to the collector and/or its components is likely. Excessive stagnation temperatures can occur when heat removal from a solar collector is slow or stopped. For example, in systems which employ a heat transfer fluid to remove heat from the collector, such as solar hot water systems, stagnation can occur during sunny periods if the flow of heat transfer fluid through the absorber is interrupted due to power failure, component failure (e.g., circulating pump failure), system servicing or repair, or pump or controller intervention due to energy storage capacity limitations, etc.

As used herein, the term "overheating" refers to a condition wherein the temperature of a solar collector and/or its components rises to a point where damage to the collector and/or its components is likely to result. The apparatus and methods described herein prevent such overheating of a solar collector.

The magnitude of the temperature reached during stagnation is dependent on climatic conditions and solar collector design and orientation. Solar collectors are generally mounted on buildings, either on rooftops or on walls, but may also be mounted on the ground or on racks and the like. In some installations, such as on walls, solar collectors may be mounted substantially vertically, i.e., with the glazing at 90° to the horizontal. Typically, solar collectors are mounted on a roof and tilted at some angle with respect to the horizontal. A sloped roof conveniently offers a tilted surface for mounting a solar collector. It will be appreciated that by appropriately adjusting the tilt angle of the collector, the amount of incident solar radiation received by a solar collector in a particular geographic location and a particular time of the year can be maximized. However, maximizing the solar radiation received also increases the likelihood of the collector reaching a high stagnation temperature. For example, a common roof slope in North America is "4 in 12", or about 18° to 20° to the horizontal. Solar collectors mounted at such tilt angle are particularly susceptible to high stagnation temperatures in the summer because of the coincidence of high solar radiation levels and high ambient air temperatures. For example, hourly solar radiation intensity and ambient temperatures of 1000 W/m$^2$ and 30° C., respectively, may occur during April to October in many locations in the Northern Hemisphere, such as Toronto, Canada.

To eliminate high stagnation temperatures in a solar collector, temperature control of the collector is required. In principle, there are two ways to control collector stagnation temperature: reduce solar energy input to the collector or remove excess heat from the collector. Of these, the latter is more practical both technically and economically, and can be achieved by modifying the heat loss characteristics of the collector. According to the invention, there is provided a solar collector with integral stagnation temperature control, which is achieved through natural convective (i.e., buoyancy driven) cooling of the collector. Use of natural convective cooling in accordance with the invention provides solar collectors that are passively (i.e., not requiring input of energy other than solar energy) self-limiting in terms of the maximum temperatures that they can attain, and that are mechanically simple and therefore highly reliable. While it is feasible to employ passive forced convective cooling, using, for example, a thermoelectric or photovoltaic fan, such cooling has costs in terms of greater mechanical complexity and associated reduced reliability.

After extensive analysis and laboratory testing, it was concluded that the most practical and reliable means of increasing heat-loss characteristics of a solar collector to avoid high stagnation temperatures was to provide convective cooling of the space below the absorber. The invention is therefore unlike many previous attempts to control stagnation in which cooling of the space above the absorber was proposed.

With reference to FIG. 1A, which depicts in longitudinal cross section a preferred embodiment of the invention, a solar collector 2 is mounted on a sloped surface 4 such as a roof. The collector comprises glazing 6 and an absorber plate 8 in a substantially parallel, spaced relationship. The collector is enclosed by sides, two of which are shown at 10, 12, and a bottom 14, which may be insulated. A venting channel 16 is provided between the absorber plate 8 and the bottom 14. Apertures 18, 20 in the collector bottom open the venting channel 16 to outside air. It will be appreciated that, because of the slope of the collector, the venting channel is also sloped, and that one aperture 20 is elevated relative to the other aperture 18. As shown in FIG. 1A, it is preferable that the apertures are provided at substantially opposite ends of the bottom 14 and venting channel 16, to provide convective air flow along the length of the venting channel. The aperture 18 at the lower end of the collector is an air inlet, and the aperture 20 at the elevated end of the collector is an air outlet.

In embodiments where the bottom of the collector is insulated, the venting channel is provided between the insulation and the absorber.

It will be appreciated that by venting the space below the absorber, the space above the absorber can be kept substantially sealed, avoiding contamination of the optical surfaces (i.e., the inside surface of the glazing and the top surface of the absorber). In addition, opening the venting channel to the underside of the collector avoids the problem of rain, snow, dust, and debris being drawn into the collector. Such problems, inherent in prior collectors in which the space between the glazing and the absorber is vented, degrade solar collector performance over time and increase maintenance requirements.

As discussed above, factors such as the configuration and orientation of a solar collector and climatic conditions need to be considered in stagnation control. In the embodiment of Example 1, below, an analysis of stagnation was carried out using a solar collector slope of 18°, incident sun intensity of 1000 W/m$^2$, and ambient temperature of 30° C. for a conventional flat-plate collector. In that embodiment, stagnation control was achieved by increasing heat loss from the collector from about 5.5 W/m$^{2\circ}$ C. to about 8.9 W/m$^{2\circ}$ C., when the absorber temperature approached/exceeded 120° C. This selected temperature of 120° C. is less than the stagnation temperature of a similar collector without integral stagnation control. Thus, by increasing heat loss of the collector when the collector temperature reaches the selected temperature, excessive stagnation temperatures in the collector are avoided. Further, because heat loss characteristics of the collector were substantially unchanged at collector temperatures below the selected temperature, collector performance at such temperatures was unaffected. It will be appreciated that the analysis can be applied to different solar collector types at different mounting slopes and in different climatic locations, resulting in different selected temperatures and amounts by which heat loss characteristics of a collector would need to be increased to provide high stagnation temperature control.

According to the invention, heat loss of a solar collector is increased to avoid high stagnation temperature by convective cooling, provided by a venting channel which vents the space behind the absorber. In the embodiment described above and in Example 1, the venting channel must dissipate up to 400 W/m$^2$ if excessive stagnation temperatures are to be prevented under extreme conditions. The dimensions and tilt angle of the venting channel affect the rate of natural convection airflow, and consequently, affect the rate of heat removal from the absorber plate. For example, a large venting channel cross-section increases heat removal but also increases the overall dimensions of the solar collector, while a smaller venting channel results in higher stagnation temperatures.

As noted above, venting of the collector occurs when the collector temperature reaches the selected temperature (which preferably is below the excessive stagnation temperature). This is achieved in accordance with the invention by providing a damper at the outlet of the venting channel. As used herein, the term "damper" is intended to mean a flap, lid, door, or valve that is used to keep the outlet and/or inlet substantially closed during normal operation (e.g., collector temperature at or below a selected temperature and below the stagnation temperature), and to substantially open the outlet and/or inlet at a collector temperature at or above a selected temperature and below the stagnation temperature. The damper may be integral with or may be associated with any suitable actuator. Preferably, the actuator is passive and is thermally-actuated.

Figure 1B:
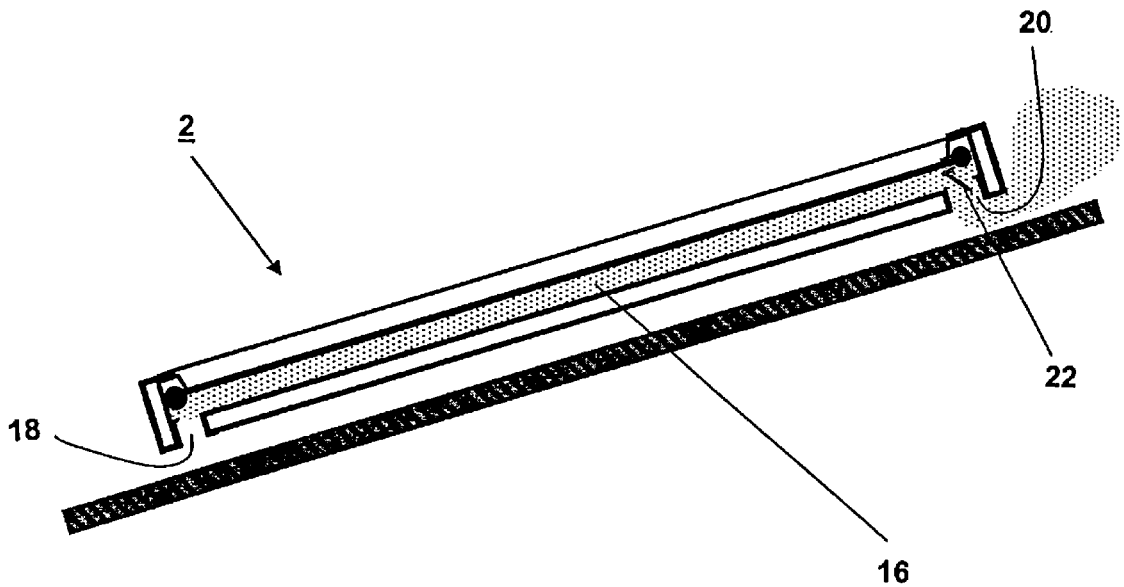

In the embodiment shown in FIGS. 1A and B, the damper 22 at the outlet 20 of the venting channel 16 is substantially flap-like. As shown in FIG. 1B, the damper opens the outlet 20 of the venting channel 16 at temperatures equal to or above the selected temperature, allowing hot air (stippled area of FIGS. 1A and 1B) to exhaust from the collector's elevated periphery and cool ambient air to enter the venting channel at the lower periphery, through the inlet 18. This air is heated in the venting channel behind the collector absorber, thereby removing excess heat from the back of the absorber plate. Movement of the air is driven passively by a temperature-induced density gradient (i.e., buoyancy force) that exists in the air in the venting channel. During normal operation, when collector temperatures are below the selected temperature, the damper is closed, restricting the circulation of air through the venting channel (FIG. 1A). Under these conditions, the air in the venting channel is heated from above and becomes thermally stratified, remains stationary, and acts as an insulating layer to heat loss from the back of the solar collector. In addition, since the air layer is heated and thermally stable, the inlet to the channel does not need to be closed, simplifying the design. Thus, only a single damper is required at the outlet; however, a second damper at the inlet can be provided if desired. As described in detail in Example 2, below, the design and geometry of the venting channel is precisely controlled to ensure that there is sufficient airflow to adequately cool the absorber under stagnation conditions and to minimize any negative impact on heat transfer rates during normal operation (i.e., below the selected temperature).

Figure 1C:
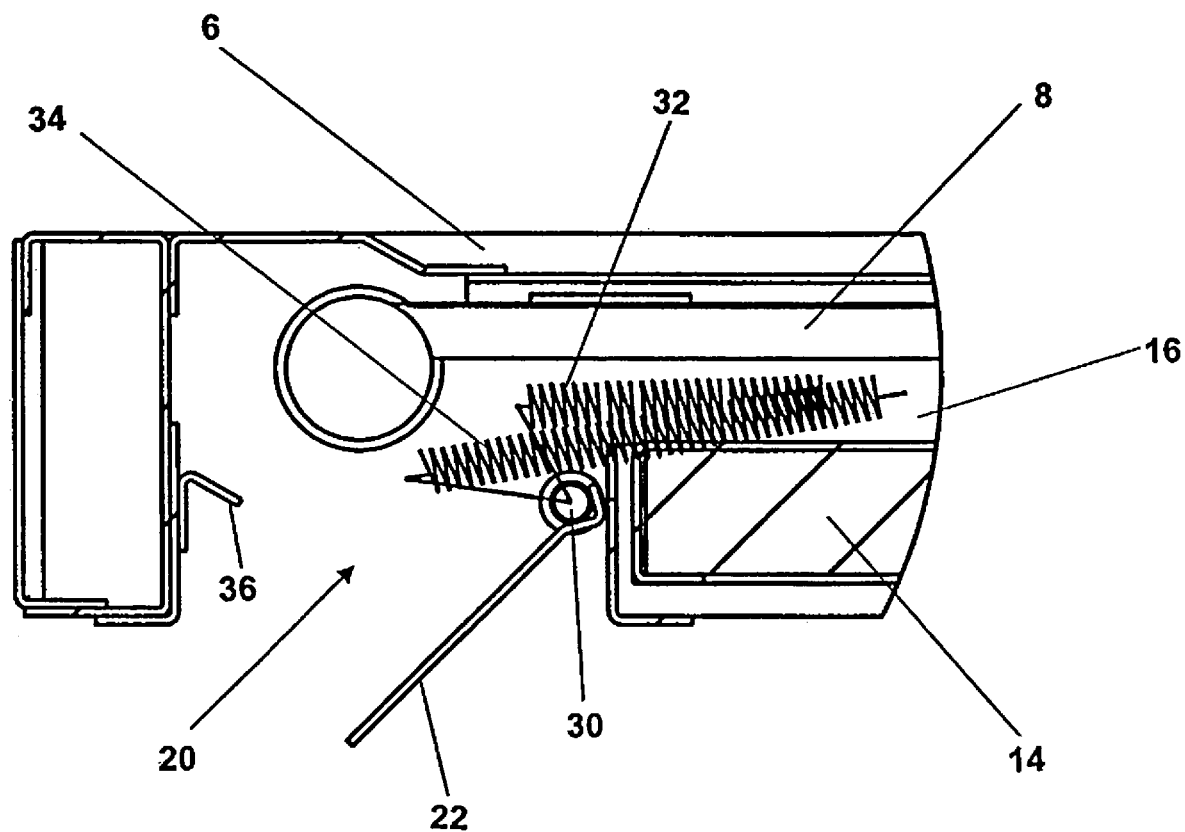
FIG. 1C is a schematic diagram showing in detail a cross-section of a solar collector with a venting channel, and a damper in the outlet of the venting channel in the open position, according to an embodiment of the invention.

FIG. 1C shows a detailed cross-sectional view of a solar collector with a damper 22 in the venting channel outlet 20 according to a preferred embodiment of the invention. In FIG. 1C, the damper 22 is in the open position. Damper 22 pivots from open to closed positions about an axis at point 30. First and second lever arms acting at the axis 30 of the damper 22 are connected to one end of a shape memory alloy spring 32 and a bias spring 34, respectively. Shape memory alloy spring 32 and bias spring 34 are anchored at their other ends. Upon the collector temperature rising to a selected temperature, the shape memory alloy spring 32 compresses, opening the damper via through force exerted on the first lever arm. At this time, the bias spring 34 is under tension. At collector temperatures equal to or below the selected temperature, the shape memory alloy spring 32 relaxes, and the bias spring 34 compresses, thereby drawing the damper into the closed position via the second lever arm. In the closed position, the damper 22 rests against a stop 36.

The ability of the venting channel to adequately cool the collector during stagnation conditions is constrained by factors that increase resistance to natural convective air flow through the channel. For example, such resistance can result from the inlet and outlet being located on the underside of the collector, and from dampers (e.g., valves) and associated actuators for opening and closing the outlet and inlet of the channel, which might interfere with air flow even when opened. As shown in the below examples, such constraints have been overcome in the invention, resulting in natural convective flow through the venting channel sufficient to avoid stagnation temperatures in the collector.

In addition, the effectiveness of the venting channel to remove heat from the solar collector depends on the rate of heat transfer from the bottom (lower) surface of the absorber to the air convecting through the venting channel. The inventors have found that is possible to substantially increase this heat transfer rate by radiatively coupling the lower surface of the absorber to other surfaces in the channel, particularly to the upper surface of the bottom of the collector (which faces the lower surface of the absorber). In effect, this allows the absorber to reradiate heat to the other walls in the channel such that they may transfer this heat to the air-stream (in the venting channel) by convection. The net effect is to increase the surface area available for convective heat transfer to the air-stream.

Radiative coupling can be established or improved by, for example, coating the surfaces of the venting channel (e.g., the lower surface of the absorber and/or the upper surface of the collector bottom, and optionally any venting channel side walls) with a high emissivity coating such as black paint. Preferably, the emissivity of the venting channel surfaces is at least about 0.5, more preferably at least about 0.7, more preferably greater than 0.8. In general, performance of the venting channel improves as emissivity of the channel surfaces increases. Radiative coupling between two (or more) surfaces is more effective if each surface has an emissivity of, e.g., 0.5, rather than one surface having an emissivity of, e.g., 0.9 and the other having an emissivity of, e.g., 0.1.

For example, in the embodiment described above and in Example 1, it was found that under those conditions, a venting channel between about 15 to 20 mm deep (i.e., the distance between absorber and insulation) was adequate when the interior of the channel was coated with a high emissivity coating, such as black paint (e.g., Tremco® Tremclad® high temperature enamel) (see also Lin et al., 2003). This high emissivity coating (about 0.9) on the venting channel surface enhanced radiative heat transfer from the lower surface of the absorber (that formed the channel ceiling) to the walls of the channel. This arrangement increased the effective surface area for the transfer of heat to the air-stream in the channel. The venting channel can be a continuous open space below the absorber, or it can be divided any number of ways, such as, for example, into two or more parallel channels. Parallel channels can conveniently be formed by extending and/or bending fins of the absorber so as to form walls separating adjacent channels. Such an arrangement enhances transfer of heat from the absorber to the venting channel.

To facilitate opening of the damper when the collector reaches the selected temperature, a thermally actuated vent damper was used. Preferably, the damper operates passively; that is, independent of any power source (other than solar), and operates under all conditions (e.g., during power failures, etc.). For this reason, thermally-actuated mechanisms are ideally suited to this application, and can be tuned or fabricated to open at any desired temperature. As well, such design closes the damper automatically as the temperature of the collector drops to or below the selected temperature, restoring normal operation of the collector.

Any thermally-actuated mechanism can be used to control the operation of the damper assembly, including, for example, gas-charged pistons, wax-filled actuators, bimetallic springs and shape-memory alloys, etc. In the embodiment shown in the below examples, a damper assembly was constructed using shape memory alloy (SMA) springs (Otsuka et al., 1998; Waram, 1993; the contents of all cited publications are incorporated herein by reference in their entirety), which can be fabricated to exert a force at a preset (i.e., selected) temperature. When using SMA devices, a conventional biasing spring (reference numeral 24 in FIG. 1A) is required to exert a return force, to keep the damper closed during normal operation.

According to another aspect of the invention there is provided a solar energy system comprising a solar collector with integral stagnation temperature control as described above, connected via a heat transfer apparatus, to a heat sink or a load. The heat transfer apparatus may comprise, for example, a circulating heat transfer fluid for removing heat from the solar collector absorber and depositing the heat into the heat sink or load, with associated tubing, pumps, and the like. The heat sink may be, for example, a heat storage device such as a hot water tank, and the load may be a device that directly uses the heat, such as a furnace.

The invention is further described below by way of the following non-limiting examples.

Example 1

Design Criteria for Stagnation Control in a Typical Solar Collector

This example presents design considerations for high stagnation temperature control in a conventional solar collector mounted at an 18° slope (i.e., a typical North American roof slope). However, it will be appreciated that the analysis can be applied to different solar collector types at different mounting slopes and in different geographic locations.

An analysis of typical weather data (obtained from Environment Canada) for North American cities, representing different geographical regions, shows that solar radiation levels (on a 18° tilted surface) greater than 1000 W/m$^2$ typically occur 45 h/yr in Canada and 78 h/yr in the southern United States. Ambient temperatures greater than 30° C. represent less than 60 h/yr in Canada but could reach 856 h/yr in the southern United States. The coincidence of solar radiation levels greater than 1000 W/m$^2$, with periods of high temperature (i.e., >30° C.), is less frequent in all cities investigated. Therefore, as a basis for further analysis, a solar radiation level of 1000 W/m$^2$ coincident with an ambient temperature of 30° C. was considered to be a design condition for stagnation temperature control.

The thermal performance of conventional solar collector is well established (Duffie et al., 1991). Under normal operating conditions, the rate of energy delivery to a load by a solar collector, $Q_{del}$, is determined by the difference between the rate at which solar energy is absorbed in the solar collector, $Q_{abs}$, and the rate of heat loss from the solar collector housing, $Q_{loss}$, i.e., $$Q_{del}=Q_{abs}-Q_{loss}$$

where: $Q_{abs}$ is determined by the product of the solar collector area, $A_c$, the transmittance ($\tau$) of the glazing and the absorptance ($\alpha$) of the absorber plate, i.e., $$Q_{abs}=A_c(\tau\alpha)G, \text{ and}$$

$Q_{loss}$ is given by the product of the total collector heat-loss coefficient ($U_L$) and the difference in temperature between the temperature of the solar collector absorber plate ($T_p$) and the surrounding air temperature ($T_a$), i.e., $$Q_{loss}=A_cU_L(T_p-T_a)$$

Under worst case stagnation conditions, no heat is delivered to the load and thus $Q_{del}=0$. As such, to control collector temperatures under "stagnation temperature" conditions, a solar collector must be able to dissipate all the absorbed energy. In effect, the temperature of the solar collector absorber will increase until $Q_{loss}=Q_{abs}$ or, $$U_L(T_p-T_a)=(\tau\alpha)G$$

Using this expression, we can estimate the temperature of the absorber during stagnation by solving for $T_p$, i.e., $$T_p=T_a+(\tau\alpha)G/U_L$$

For typical collector designs, $(\tau\alpha)=0.8$ and $U_L=5.5$. Therefore, for an incident sun intensity of 1000 W/m² and $T_a=30°$ C., the stagnation temperature of the absorber, $T_p$, would be 175° C.

Similarly, to limit the absorber temperature to less than 120° C., the total collector heat loss ($U_L$) would have to increase to 8.9 W/m²° C.

Heat loss normally occurs from the top, sides and bottom of a solar collector housing. In a traditional flat-plate collector design, heat loss from the top of the absorber plate to the glazing (and surroundings) occurs by convection and re-radiation. Heat loss from the sides and bottom is dependent on the thermal resistance of the collector housing, which is usually insulated. Current designs are typically insulated such that the thermal resistance through the back and sides of the collector housing is approximately 1.5 W/m²° C.

The top heat loss from a collector depends on the properties of the glazing, the absorber coating and the thermal resistance of the air-layer between the absorber and the glazing. For a typical solar collector design, the top heat loss reaches approximately 4 W/m²° C. when the absorber temperature approaches 120° C.

Therefore, assuming a casing (i.e., back and side) thermal resistance of 1.5 W/m²° C., the goal of integral stagnation temperature control is to enhance heat loss from the collector, from a typical value of 5.5 W/m²° C. to 8.9 W/m²° C., whenever the absorber temperature approaches (and exceeds) 120° C. At lower temperatures, heat loss from the collector should not be affected thereby assuring that heat losses from the solar collector are minimized during normal operation.

Example 2

Design and Evaluation of the Venting Channel

To predict the magnitude of the cooling effect and to optimize the design of the venting channel, computer modeling and simulation using a Computational Fluid Dynamics (CFD) program, and laboratory testing under controlled conditions, of a solar collector absorber with integral venting channel was carried out. CFD models for channels with a straight inlet and outlet and with an inlet and outlet with downward-facing 90° bends were developed. The modeling simulated the heat-flux input from the lower surface of the absorber plate to air located in a venting channel below the absorber. Heating of air below the absorber resulted in an increase in local air-temperature and a corresponding reduction in air density. The reduction in local air density created a buoyancy force that initiated a natural convection flow within the heated air below the absorber plate. As long as the heated air was allowed to exhaust from the venting channel, cooler ambient air would displace the heated air in the channel. Through this process, a natural convection cooling of the under surface of the absorber was achieved.

The results of this modeling indicated that the temperature distribution on the absorber plate was a function of the depth of the venting channel and the tilt angle of the channel (i.e., the tilt or slope of the solar collector). Simulations were conducted for channel depths of 10 mm, 20 mm, and 30 mm. For these simulations, the heat flux input was set to 400 W/m² and it was assumed that there was zero heat loss from the bottom of the channel. It was found that the depth of the channel strongly influenced heat loss for depths between 10 and 20 mm. In addition, increasing the depth beyond 20 mm increased heat loss only slightly. Also investigated were the effects of channel tilt and inlet/outlet configuration on the natural convection flow and heat removal rate in the channel and the corresponding temperature distribution of the absorber plate.

In the results, the velocity profile was obtained for an 18° tilted channel with a 90° downward-facing outlet for an absorber heat flux of 400 W/m² and an ambient temperature of 30° C. In similar runs the corresponding upper surface was indicated to be 140° C. near the outlet of the channel with a maximum velocity in the channel of approximately 0.7 m/s. Reducing heat flux from the absorber plate correspondingly reduced the maximum temperature in the channel.

To verify the simulation results and proposed channel design, a laboratory test apparatus was constructed and experimental tests were conducted at Queen's University at Kingston, Ontario, Canada. The test apparatus consisted of a 2.4 m long by 0.29 m wide channel. The channel was mounted such that its tilt angle (relative to horizontal) could be changed and the depth of the channel could be adjusted. The top of the channel was constructed from a single aluminum plate. Heating strips were bonded to the top surface of the channel to simulate the solar energy input and a 75 mm insulation layer was applied on top of the heating strip to avoid heat loss through the upper surface of the apparatus. The sides and bottom of the channel were constructed from steel sheets and were insulated with 25 mm of foam insulation. An AC power supply was used to control the power input to the heaters.

Tests were carried out in an air-conditioned room with ambient temperatures maintained between 20 and 25° C. Heat input to the upper surface (simulated collector absorber) was controlled to fixed values ranging between 100 W/m² and 400 W/m². Temperatures along the upper surface and the bottom surface of the channel were measured using copper/constantan thermocouples. On both the top and bottom surfaces, eight thermocouples were placed 20 cm apart along the centerline from inlet to outlet. The first thermocouple was placed 10 mm from the channel inlet.

A steady-state method was used for all the tests. With this procedure, fixed power input was set at the start of the test and the temperature on the top surface was measured until the steady-state was reached. Measurements were recorded at five-minute intervals using a computer-based data-acquisition system.

Case 1: Convective Cooling Channel

Testing was first carried out for channels of different depths and with uncoated channel surfaces that have low radiative emissivity. As such, these results are representative of cases for which convective cooling of the upper channel surface was the dominant heat transfer mechanism, i.e., radiation heat transfer played a only a small role. As well, during these tests, the bottom of the channel was not insulated. The channel temperature was measured for two tilt angles (18° and 30°) and four channel depths (10, 20, 30, and 50 mm) with the input power level set at 400 W/m². As expected, the upper surface temperature increased along the channel from the inlet to outlet under all conditions. Results indicated that the maximum temperature on the upper surface increased only slightly as the channel depth was reduced from 50 mm to 20 mm. A considerable increase in surface temperature occurred when the channel depth was reduced to 10 mm. This result is consistent with the CFD simulation and indicates that the optimum depth for the cooling channel is about 20 mm.

The tilt angle also influenced heat loss from the channel. Measured temperatures for venting channels with a tilt angle of 30° were about 5 to 10° C. lower than those at 18°.

The temperature on the bottom of the venting channel was also monitored during testing. It was found that when the channel depth was larger than 20 mm, the average bottom surface temperature was only slightly above ambient temperature. This indicates that above 20 mm, increasing the channel depth does not lead to a significant increase in heat loss from the channel. The results also indicated that the maximum channel temperature was above 122° C. irrespective of channel depth when the ambient temperature was near 25° C.

Case 2: Enhanced Cooling Channel

The above test results indicated that convective heat loss from the channel was relatively low and that the bottom and side walls of the channel contributed very little to the heat transfer process. Heat dissipation from the top wall, however, consisted of two components: convection (to the air) and radiation (to the bottom and side walls). As such it was decided to augment the overall heat transfer in the channel by increasing the emissivities of the interior channel surfaces. With increased emissivity on these surfaces, radiation emitted from the ceiling of the channel (i.e., the bottom surface of the absorber) will be transferred to the walls and floor of the channel, resulting in their heating. These surfaces will then, in turn, convect heat to the air in the channel. The net effect is to increase the effective surface area for heat transfer to the air. Through this method, the rate of heat transfer in the channel can be enhanced. Therefore, for the second test sequence, the interior surfaces of air channel were coated with black paint with radiative emittance and absorptance of 0.9.

A channel of 22 mm depth was tested with a heat flux input of 400 W/m$^2$ and at an ambient air temperature of 20° C. The bottom wall of the channel was insulated with 20 mm of foam insulation. Temperatures were measured on both the top and bottom surfaces of the channel, and indicated that the maximum top surface temperature was below 97° C. and the maximum bottom surface temperature was about 78° C. The calculated heat loss coefficient, in this case, was 6.5 W/m$^{2o}$ C.

Based on these test results, and determinations of heat loss coefficient as a function of temperature difference between the absorber and ambient temperature for several collector designs, it was concluded that a collector having a venting channel that has been coated with a high emissivity black paint will have an effective heat loss between 6 and 8 W/m$^{2o}$ C., even when there is no heat loss from the lower surface of the venting channel.

Example 3

Fabrication and Evaluation of a Solar Collector with Stagnation Control

To verify the functional performance and operation of a solar collector with Integral Stagnation Temperature Control (ISTC) according to the invention, a prototype solar collector was constructed for experimental testing under real environmental conditions. Tests were performed during May and June of 2002, at the Solar Calorimetry Laboratory at Queen's University in Kingston, Ontario, Canada.

The collector was a parallel riser design with upper and lower header pipes. Prefabricated tube and sheet absorber strips were folded to form the integral venting channel located below the absorber. The upper surface of the absorber was pre-coated with a "black chrome" selective absorber surface coating (SunSelect® coating on copper, Nova Solar, Germany) and the back surface of the absorber was painted with a high emissivity black paint (as above).

For the tests, the ISTC collector was located next to a reference collector. The reference collector consisted of an absorber strip that was well insulated and therefore indicated the unrestricted stagnation temperature that would occur in a typical solar collector under the test conditions. Both collectors were oriented at an 18° tilt to the horizontal and were faced due south for the stagnation tests. To simulate an extreme stagnation condition, both collectors were tested "dry", with no circulation of heat transfer fluid.

Both the reference collector and the ISTC collector were instrumented with thermocouple temperature sensors. Temperatures on each collector's absorber and the back insulation plate were measured. Measuring points were located on the collector bottom, close to the inlet, the middle of the collector, and top of the collector close to the temperature-controlled valve. During the test period, the ambient temperature, temperatures in the collector and solar radiation on collector surface were measured. A computer-based data acquisition system was used to collect the test data. All measurements were recorded as mean quantities over 5 minute periods.

Figure 2:
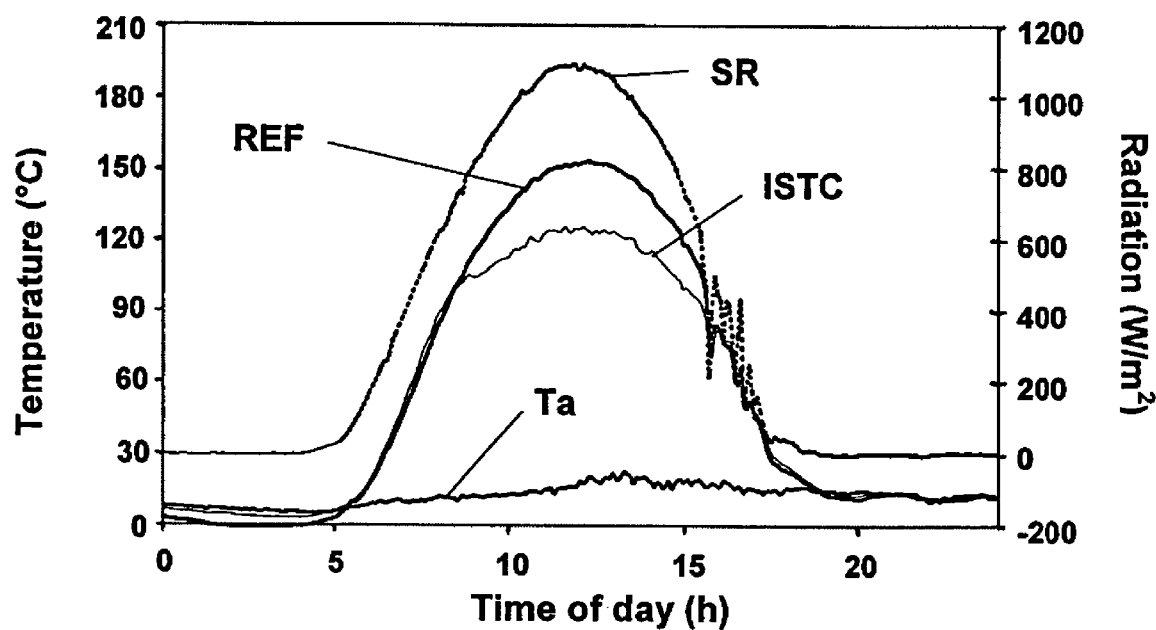
FIG. 2 is a plot showing ambient temperature (Ta), solar radiation intensity (SR), and temperatures of a reference collector (REF) and a solar collector with integral stagnation temperature control (ISTC) according to an embodiment of the invention during a 24 hour day.

Temperatures in both collectors were monitored over an extended period in May and June. FIG. 2 shows the maximum temperatures in both collectors and the corresponding solar radiation (SR) and ambient temperature (Ta) for one clear day of the period. Both the ISTC and reference (REF) collectors' temperatures increased as solar radiation increased. The results show that the maximum temperature in the ISTC collector was slightly higher than that in the reference collector before the temperature reached 100° C. As the solar radiation level increased beyond this point, the temperature of the ISTC collector was observed to increase at a slower rate than the reference collector and to stabilize around 120° C. The reference collector reached a temperature of 158° C. during the corresponding period.

The operation of the control valve was verified by visual inspection during this time. Later in the day, as the intensity of the sun dropped, the valve was observed to close and the discrepancy between the collectors' temperatures disappeared. These results indicate that the heat loss from both collectors was identical below 90° C. and that the heat loss from the advanced collector was significantly increased above 100° C.

The temperatures recorded in both collectors over the extended period verify the operation of the stagnation control features of the ISTC collector and demonstrate that high temperatures in the collector are limited by the invention. In addition to the comparative tests described above, the maximum stagnation temperature of the ISTC collector was determined with the integral stagnation control disabled. This was done for two reasons: to confirm the heat loss characteristics of the ISTC collector without the stagnation control, and to quantify the maximum stagnation temperatures under this condition. For this test, the venting channel outlet was sealed and covered with a 20 mm thick insulation board. The maximum temperatures recorded for the ISTC and reference collectors show that the temperature reached in the ISTC collector was slightly higher than that in the reference collector throughout the day. With a solar radiation intensity of 1150 W/m$^2$ and an ambient temperature of 25° C., the maximum stagnation temperature was 170° C. in the ISTC collector and 160° C. in the reference collector. This result indicates that the ISTC collector had a lower heat loss than the reference collector under normal operating conditions further illustrating the benefit of the integral stagnation control.

In summary, the results show that heat loss from the ISTC collector was comparable to the reference when the temperature in the collector was below 90-100° C. When the temperature was above 100° C., heat loss from the ISTC collector increased and limited the stagnation temperature. Results indicated that at a solar radiation intensity of 1100 W/m² and a ambient temperature of 25° C., a collector stagnation temperature of 120 to 122° C. was observed. These results verify the operation of the stagnation control features of the ISTC collector and demonstrate that high stagnation temperatures in the collector are prevented by the invention.

Those of ordinary skill in the art will recognize, or be able to ascertain through routine experimentation, equivalents to the embodiments disclosed herein. Such equivalents are within the scope of the invention and are covered by the appended claims.

REFERENCES

Duffie, J. A. and Beckman, W. A., Solar Engineering of Thermal Processes, 2$^{nd}$ Edition, JohnWiley & Sons, Inc., 1991.
Lin, Q. and Harrison, S. J., Experimental Study of Natural Convection in an Asymmetrically Heated Inclined Channel With Radiation Exchange, Proceedings of HT2003, ASME Summer Heat Transfer Conference, Jul. 21-23, 2003.
Otsuka, K. and Wayman, C. M., editors, Shape Memory Materials, Cambridge University Press, New York, 1998.
Waram, T. C., Actuator Design Using Shape Memory Alloys, ISBN 0-9699428-0-x, 1993.

We claim:

1. A solar collector comprising:
an absorber having an upper surface for receiving solar radiation and a lower surface, the absorber adapted for circulating a heat transfer fluid therethrough;
a bottom portion having:
(a) an upper surface substantially facing the lower surface of the absorber; and
(b) an air inlet and an air outlet disposed therethrough;
a venting channel between the lower surface of the absorber and the upper surface of the bottom portion;
wherein the air inlet and the air outlet are in communication with the venting channel and at substantially opposite ends thereof;
wherein the lower surface of the absorber is radiatively coupled to the upper surface of the bottom portion;
wherein the radiatively coupled surfaces are treated to have high emissivity to enhance radiative heat transfer from the lower surface of the absorber to the upper surface of the bottom portion, such that surface area for convective heat transfer to air in the venting channel is increased;
wherein passive air flow from the inlet, through the venting channel, and out the outlet removes heat from the venting channel.

2. The solar collector of claim 1, wherein the air outlet is elevated relative to the air inlet.

3. The solar collector of claim 1, wherein the venting channel includes at least one other radiatively coupled high-emissivity surface.

4. The solar collector of claim 3, wherein at least one radiatively coupled surface has an emissivity of at least 0.5.

5. The solar collector of claim 1, wherein the passive air flow is caused by convection.

6. The solar collector of claim 1, further comprising at least one of a damper for opening and closing the air inlet and a damper for opening and closing the air outlet.

7. The solar collector of claim 6, wherein the at least one damper opens at a temperature equal to or above a first selected temperature, and closes at a temperature equal to or below a second selected temperature;
wherein the first and second selected temperatures are below a stagnation temperature of the solar collector.

8. The solar collector of claim 6, wherein the at least one damper operates passively.

9. A solar energy system comprising:
the solar collector of claim 1;
heat transfer apparatus for removing heat from the solar collector; and
a heat sink or load for accepting heat from the heat transfer apparatus.

10. A method for increasing heat loss of a solar collector, comprising:
providing an absorber having an upper surface for receiving solar radiation and a lower surface, the absorber adapted for circulating a heat transfer fluid therethrough;
providing a bottom portion of the solar collector, the bottom portion having:
(a) an upper surface substantially facing the lower surface of the absorber; and
(b) an air inlet and an air outlet disposed therethrough;
providing a venting channel between the lower surface of the absorber and the upper surface of the bottom portion, wherein the air inlet and the air outlet are in communication with the venting channel and at substantially opposite ends thereof; and
radiatively coupling the lower surface of the absorber to the upper surface of the bottom portion;
wherein radiatively coupling includes treating the surfaces to have high emissivity to enhance radiative heat transfer from the lower surface of the absorber to the upper surface of the bottom portion, such that surface area for convective heat transfer to air in the venting channel is increased;
wherein passive air flow from the air inlet through the venting channel to the air outlet increases heat loss of the solar collector.

11. The method of claim 10, further comprising disposing the solar collector such that the air outlet is elevated relative to the air inlet.

12. The method of claim 10, including radiatively coupling at least one other high emissivity surface to the venting channel.

13. The method of claim 10, further comprising providing an emissivity of at least about 0.5 to at least one surface of the venting channel.

14. The method of claim 10, further comprising providing at least one of a damper for opening and closing the air inlet and a damper for opening and closing the air outlet.

15. The method of claim 14, further comprising opening and closing the at least one damper passively.

16. The method of claim 14, further comprising opening the at least one damper at a temperature equal to or above a first selected temperature, and closing the at least one damper at a temperature equal to or below a second selected temperature;
wherein the first and second selected temperatures are below a stagnation temperature of the solar collector.

17. The method of claim 16, wherein the first selected temperature and the second selected temperature are substantially the same.

* * * * *